P. F. DEAN.
Vehicle Seat.
No. 104,714.
Patented June 28, 1870.
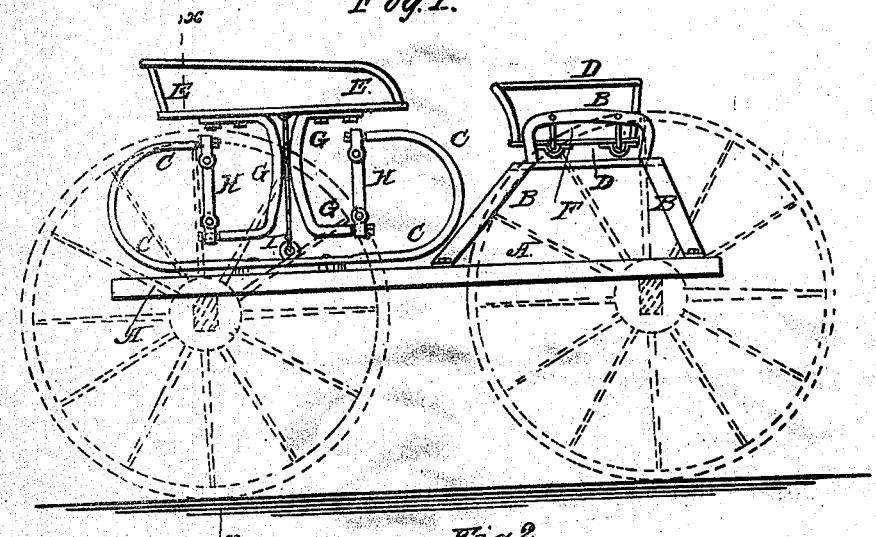
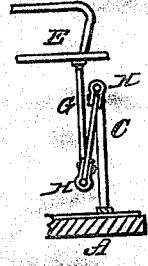

United States Patent Office.

PORCIUS FESTUS DEAN, OF WATSONVILLE, CALIFORNIA.

Letters Patent No. 104,714, dated June 28, 1870.

IMPROVEMENT IN SEATS FOR VEHICLES.

The Schedule referred to in these Letters Patent and making part of the same.

*To all whom it may concern:*

Be it known that I, PORCIUS FESTUS DEAN, of Watsonville, in the county of Santa Cruz and State of California, have invented a new and useful Improvement in Seats for Vehicles; and I do hereby declare that the following is a full, clear, and exact description thereof, which will enable others skilled in the art to make and use the same, reference being had to the accompanying drawing forming part of this specification.

Figure 1 represents my improved seat and a modification of the same, as attached to a buggy-frame.

Figure 2 is a detail sectional view of the same, taken through the line $x\ x$, fig. 1.

Similar letters of reference indicate corresponding parts.

My invention has for its object to furnish an improved seat for buggies, carriages, cars, and other vehicles, so that, when in use, they may be easier for the rider; and It consists in suspending the seat from the seat-frame, as hereinafter more fully described.

A represents the frame of the vehicle.

B and C are the seat-frames, from which the seats D and E are suspended.

The seat-frame B is made close at its upper part, being similar to the seat-frame of a sulky.

The seat-frame C is made open at its upper part, as shown in fig. 1, being similar to a double sleigh-runner.

F are crank-irons, the lower parts of which are pivoted to the bottom of the seat D, and their ends bent upward, and are pivoted to the top side-bars of the frame B, so that the seat may oscillate or swing backward and forward, while being held all the time in a horizontal position.

In the case of the seat E, the crank-arms G are rigidly attached at their upper ends to the seat E, and their lower ends project forward and rearward, as shown in fig. 1.

In this case the oscillation is obtained from the bars H, the lower ends of which are pivoted to the ends of the crank-arms G, and their upper ends to the upper ends of the bars of the open seat-frame C. By this construction, the seat may oscillate forward and back, and laterally, and will be all the time held in a horizontal position.

The swing of the seat E may be limited by a cord or strap, I, the upper end of which is attached to the center of the bottom of the seat E, and its lower end to the frame A, or bottom of the vehicle. By this construction the seat will yield, upon the occurrence of jars or jolts, so as to relieve the rider from the effect of the shocks thus occasioned.

Having thus described my invention,

I claim as new and desire to secure by Letters Patent—

The seat-frames C C, made open on their upper sides, and connected with the seat-supporting crank-irons G G, as shown and described, for the purpose specified.

PORCIUS FESTUS DEAN.

Witnesses:
L. SANBORN,
GEORGE B. CARY.